(12) United States Patent
Zagni et al.

(10) Patent No.: US 7,946,506 B2
(45) Date of Patent: May 24, 2011

(54) HYDRAULIC HEATING APPARATUS

(75) Inventors: Julian Patrick Zagni, Yeovil (GB); Paul Leadley, Yeovil (GB)

(73) Assignee: Honeywell Normalair-Garrett (Holdings) Limited, Yeovil, Sommerset (GB)

( * ) Notice: Subject to any disclaimer, the term of this patent is extended or adjusted under 35 U.S.C. 154(b) by 314 days.

(21) Appl. No.: 12/139,478

(22) Filed: Jun. 15, 2008

(65) Prior Publication Data

US 2009/0025811 A1 Jan. 29, 2009

(30) Foreign Application Priority Data

Jun. 15, 2007 (GB) .................................. 0711629.6
Jul. 30, 2007 (GB) .................................. 0714783.8

(51) Int. Cl.
*G05D 23/02* (2006.01)
*G05D 23/12* (2006.01)
*G05D 11/00* (2006.01)

(52) U.S. Cl. .............. 236/101 R; 236/93 A; 236/101 A; 37/111

(58) Field of Classification Search ................ 62/101 R, 62/92 R, 93 R, 92 D, 93 A, 101 A; 137/861, 137/111
See application file for complete search history.

(56) References Cited

U.S. PATENT DOCUMENTS

| 4,454,982 A | 6/1984 | Reick et al. |
| 6,688,319 B2 * | 2/2004 | Trantham et al. ................. 137/2 |
| 2002/0185175 A1 | 12/2002 | Dyer et al. |
| 2008/0041971 A1 * | 2/2008 | Trantham et al. .......... 236/93 A |

FOREIGN PATENT DOCUMENTS

GB 2056720 A 3/1981

* cited by examiner

*Primary Examiner* — Chen-Wen Jiang
(74) *Attorney, Agent, or Firm* — MacMillan, Sobanski & Todd, LLC

(57) ABSTRACT

A hydraulic heating apparatus includes a body having an inlet for high pressure fluid, and an outlet for heated fluid, a chamber within the body and a flow path for the high pressure fluid between the inlet and the chamber. The high pressure fluid flows through a restriction in the flow path between the inlet and the chamber whereby the apparatus becomes heated. The working fluid flowing from the inlet to the chamber must pass through an orifice which is closable by a linearly acting closure structure. The closure structure is urged to a position in which the closure structure closes the orifice when the pressure of the high pressure fluid is below a threshold pressure. The closure structure includes a thermally sensitive material which expands in response to increasing temperature to close the orifice in response to a temperature above a threshold temperature.

20 Claims, 3 Drawing Sheets

HYDRAULIC HEATING APPARATUS

CROSS-REFERENCE TO RELATED APPLICATIONS

Priority is claimed to British patent application Serial No. 0711629.6 filed Jun. 15, 2007 and to British patent application Serial No. 0714783.8 filed Jul. 30, 2007.

STATEMENT REGARDING FEDERALLY SPONSORED RESEARCH OR DEVELOPMENT

Not Applicable.

TECHNICAL FIELD

This invention relates to a hydraulic fluid heating apparatus and more particularly to an apparatus which is capable of heating hydraulic fluid for use in a hydraulic system, for example, a closed hydraulic system.

BACKGROUND OF THE INVENTION

A hydraulic system in an aircraft, for example, may include actuators or other powered devices which operate to cause movement of aerofoil surfaces such as ailerons or flaps, or for other purposes in the aircraft. These systems may operate most efficiently if the hydraulic fluid which operates the actuators or other power devices is at or above a preferred minimum temperature.

In a typical hydraulic system, hydraulic fluid is withdrawn from a reservoir, pressurized for operating hydraulic devices and the returned to the reservoir for recycling. As used herein, the pressurized hydraulic fluid is referred to as "working fluid" or the "high pressure fluid" which performs work in operating the hydraulic devices. It will be appreciated that returning hydraulic fluid which has been used to power the operation of an upstream hydraulically powered device, will be of a lower pressure than the working fluid which is fed to the hydraulically powered device. The returning fluid may also be at a lower temperature than a minimum temperature at which it is desired the fluid is maintained, for example less than 20° C.

BRIEF SUMMARY OF THE INVENTION

According to a first aspect of the invention we provide a hydraulic fluid heating apparatus which includes an inlet for higher pressure hydraulic fluid, an outlet for lower pressure hydraulic fluid, a chamber within the body and a flow path for the high pressure fluid between the inlet and the chamber. There may be a restriction in a flow path between the inlet and the chamber through which restriction higher pressure fluid is constrained to pass whereby the apparatus becomes heated. There may be an orifice through which the working fluid flowing from the higher pressure inlet to the chamber must pass. The orifice is closable by a linearly acting closure structure. The closure structure is urged by a resilient device to a position in which the closure structure closes the orifice when the pressure of the high pressure fluid is below a threshold pressure. The closure structure also may include a thermally sensitive material which in use is subjected to the temperature of fluid flowing to the outlet. The material expands in response to increasing temperature to cause the closure structure to close the orifice when the thermally sensitive material senses a temperature above a threshold temperature. Thus, the orifice may be closed by the closure structure both in response to a decrease in the pressure of the high pressure fluid at the higher pressure inlet below the threshold pressure, and/or in response to sensing a temperature above the threshold pressure.

In one embodiment, the apparatus includes also an inlet for lower pressure fluid. Higher pressure working fluid which flows to the outlet is combined with lower pressure system fluid, and the lower pressure fluid flowing from the lower pressure inlet to the outlet will be heated. The closure structure closes the orifice in response to both a low pressure at the high pressure working fluid inlet and in response to sensing a higher than threshold temperature to regulate the degree of heating of the flowing lower pressure system fluid. Thus the temperature of the lower pressure system fluid cannot be heated above the threshold temperature by the apparatus and working fluid pressure cannot be lost from the apparatus in the event of a reduction in the pressure of the fluid at the higher pressure working fluid inlet. In another embodiment, the apparatus need not include the low pressure inlet so that only higher pressure working fluid which was delivered to the higher pressure fluid inlet and has flowed through the orifice is heated and passes to the outlet. Whether the apparatus is a two or three port design will depend upon the requirements of a hydraulic system in which the apparatus is provided.

In a second embodiment, there is provided an outlet for heated system fluid which is separate to an outlet for the working fluid. The working fluid may, in flowing from the higher pressure inlet to its outlet, flow past a portion of the closure structure where the thermally sensitive material is provided so that the thermally sensitive material is primarily subjected to the temperature of the working fluid.

Various objects and advantages of the invention will become apparent from the following detailed description of the invention and the accompanying drawings.

DETAILED DESCRIPTION OF THE INVENTION

Figure 1:
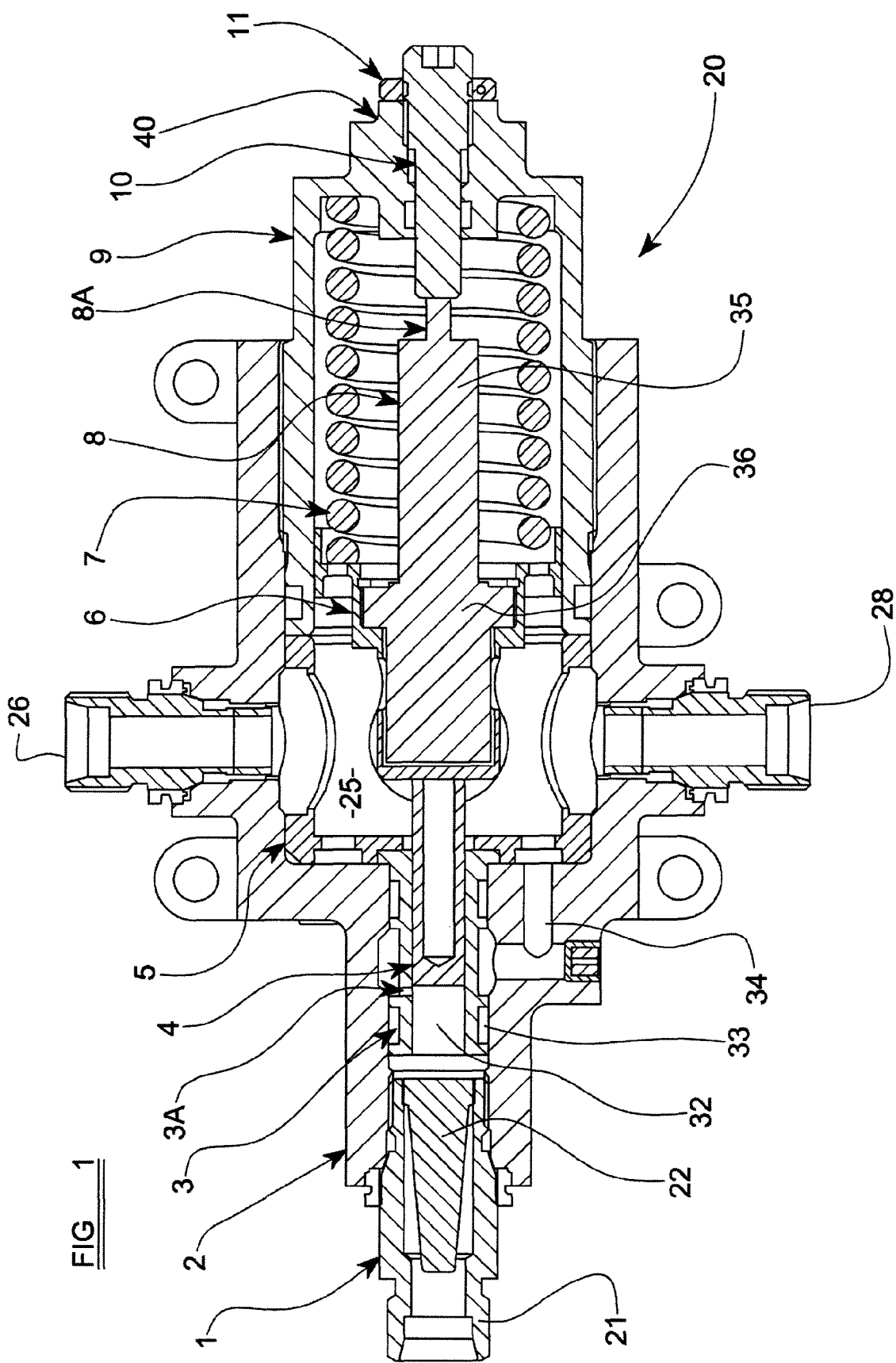
FIG. 1 is a cross sectional view of a first embodiment of a hydraulic fluid heating apparatus in accordance with the first aspect of the present invention.

Referring to FIG. 1 a hydraulic heating apparatus 20 is illustrated, which includes a body 2 which preferably is made of an aluminium alloy and is thus readily heat conducting, or from another heat conducting material. The body 2 includes an inlet 1 for higher pressure working hydraulic fluid, which may be bled from a high pressure line of a hydraulic system in which the apparatus 10 may be provided as hereinafter described. The inlet 1 includes an inlet fitting 21 which may include a filter 22 for filtering out any particulate matter which might be present in the working fluid.

The body 2 further includes a main chamber 25 which is closed by a cap 9, which again may be made of an aluminium alloy for efficient heat conduction. In this example, opening into the main chamber 25, is a lower fluid pressure inlet 26, and opening out of the main chamber 25 is a lower pressure system fluid outlet 28. In use, the apparatus 20 is provided in a return line for low pressure system fluid which has been used to power the operation of an upstream hydraulically powered device, such as for example only, an actuator for moving an aerofoil surface such as an aileron in an aircraft.

The purpose of the apparatus 20 is to regulate the temperature of the returning system fluid to maintain the temperature of the returning fluid at least above a threshold temperature, for example at or above 20° C. The actual temperature will depend on the specifications for the hydraulic system. Heating of the system fluid is effected as it passes through the body 2 of the apparatus 20. Heating is effected by constraining the high pressure working fluid entering the body 2 at the high pressure inlet 1 to pass though a restriction 3A where the pressure of the high pressure working fluid is reduced and heat generated will effect heating of the aluminium alloy body 2 of the apparatus 20.

In this example, the high pressure working fluid which enters the body 2 through the working fluid inlet 1 passes into an axially extending chamber 32. The restriction 3A is provided in a wall of the axially extending chamber 32. The working fluid which passes through the restriction 3A passes via though an annular space 33 between the axially extending chamber 32 and the body 2, though an axially extending drilling or passage 34 in the body 2, and into the main chamber 25. In the main chamber 25, the reduced pressure working fluid which entered the apparatus 10 through the high pressure working fluid inlet 1 mixes with the lower pressure system fluid flowing from the system fluid inlet 26 to the outlet 28. Thus the outlet 28 provides, in this embodiment, an outlet for both the system and working fluid.

The axially extending chamber 32 in which the restriction 3A is provided is provided by a cylindrical sleeve 3 which is made of steel. The sleeve 3 is fixed relative to the body 2.

The restriction 3A in this example also provides the function of an orifice which may be closed by a closure structure 8 to stem the flow of high pressure working fluid through the restriction 3A in order to regulate the heating of the lower pressure system fluid. As used herein, "restriction" and "orifice" are both intended to mean a reduction in the cross sectional area in the fluid flow path. Depending on the embodiment of the invention, a restriction and an orifice may refer to the same element or may refer to different elements. The closure structure 8 includes a first part 35 which is elongate and includes a radially outwardly extending formation 36. The formation 36 guides sliding of the closure structure 8 in the cap 9 and provides a seal to prevent fluid from the main chamber 25 passing beyond into a closed end 40 of the cap 9. A resilient device, namely a coil spring 7, bears at one axial end on the radially outwardly extending formation 36, and at the other end on the closed end 40 of the cap 9.

The closure structure 8 includes a second part 4 which provides a piston which slides in the axially extending chamber 32 of the body 2. The first part 35 and the second part 4 of the closure structure 8 are relatively moveable as thermally sensitive material which may be contained in a copper or brass enclosure, expands and contracts in response to sensing changing temperature. In this example, the thermally sensitive material is primarily responsive to the temperature of the system fluid flowing through the main chamber 25. The thermally sensitive material is preferably a material or combination of materials which has a high coefficient of expansion, by which we mean for example a linear of expansively of 0.0001 $K^{-1}$. One suitable material is paraffin wax.

By virtue of the spring 7 and the thermally sensitive material, it will be appreciated that the piston 4 will slide in the axially extending chamber 32 to close off the orifice 3A both in response to the pressure of the fluid at the high pressure working fluid inlet 1 reducing, such that the spring 7 force overcomes the pressure in the axially extending chamber 32, and in response to the thermally sensitive material sensing increasing temperature when the material will expand. The spring 7 functions to prevent fluid from the main chamber 25 from passing back through the orifice 3A, to maintain the integrity of both the low pressure system fluid and the high pressure working fluid, whilst the thermally sensitive material acts to regulate the degree of heating of the flowing low pressure fluid, by reducing and ultimately closing off the orifice 3A and hence the restriction, when the temperature sensed is above a threshold temperature.

In one example, for illustrative purposes only, if the pressure of the high pressure working fluid falls below 2610 psig, the spring 7 will act to move the piston 4 to close the orifice 3A. If the temperature sensed by the thermally sensitive material of the first closure structure part 35 senses a temperature of less than 20° C., the material will contract substantially maximally. Thus provided that the higher pressure fluid is at a pressure of above 2610 psig, the orifice 3A will be open and heating will be effected. However, as the temperature rises due to heating, the thermally sensitive material will expand, and the piston 4 of the closure structure 8 will be moved to close the orifice 3A. At a temperature of about 30° C. in this example, the thermally sensitive material will have acted to move the piston 4 sufficiently to close the orifice 3A.

Notwithstanding that the orifice 3A may be closed, the thermally sensitive material is able to continue to expand if subjected to higher temperatures than 30° C., for example if the temperature of the flowing system fluid increases for reason other than heating in the apparatus 20. Such expansion can be accommodated by the axially extending chamber 32 extending axially for sufficient distance towards the higher pressure inlet fitting 21.

The cap 9 includes at the closed end 40, an adjuster 10 and lock nut 11, so that the position of the piston 4 in relation to the orifice 3A can be adjusted at a datum high pressure working fluid pressure, and temperature.

Item 5 indicated in the drawing is a cylindrical spacer between the body 2 and the cap 9, through openings of which the system fluid flows into and from the main chamber 25.

The FIG. 1 apparatus 20 described is a three ported configuration hydraulic fluid heating device which is intended to be plumbed into the fluid return line as hereinbefore described. In a modification, the outlet 28 may be connected to the fluid return line, and there need be no lower pressure system fluid inlet 26, in which case the fluid flowing in the return line would be heated only as a result of mixing with heated reduced pressure working fluid from the apparatus 20 rather than also as a result of the flowing low pressure system fluid gaining heat from the body 2 of the apparatus 20 as the fluid flows through the apparatus 20 as in the example shown.

Figure 2:
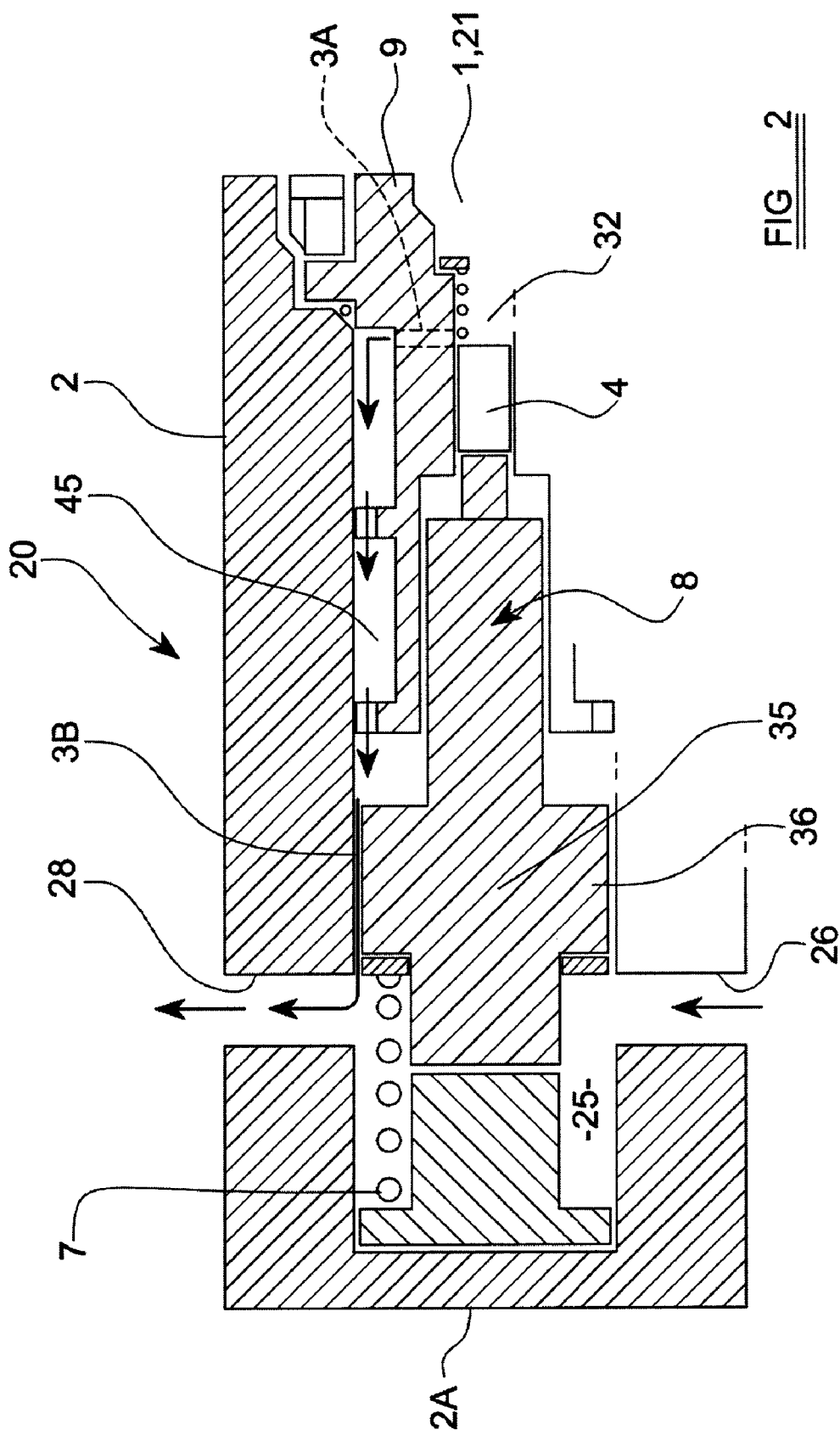
FIG. 2 is a fragmentary cross sectional view of a second embodiment of a hydraulic fluid heating apparatus in accordance with the first aspect of the present invention.

FIG. 2 shows an alternative embodiment in which similar parts to those shown in FIG. 1 are labelled by the same references. The body 2 is closed by a cap 9 which provides the high pressure working fluid inlet 1, 21. No filter 22 is shown but would preferably be provided to guard against small particulate matter clogging the restriction through which the higher pressure fluid is constrained to pass to effect heating. An axially extending passage 32 is provided at the inlet 1, 21, and in the cap 9 there is provided an orifice 3A into which the high pressure working fluid from the inlet 1, 21 can pass without undergoing any substantial change in pressure.

Between the cap 9 and body 2 there is provided an axial flow path 45 towards a main chamber 25, via a restriction 3B. In this example the restriction 3B is provided between a first part 35 of a closure structure 8 and the inside wall of the body 2. As the high pressure working fluid flows through the restriction 3B its pressure will reduce and heat will be given up to the body 2 and first part 35 of the closure structure 8. A spring 7 acts between a closed end 2A of the body 2 and the first part 35 of the closure structure 8. The first part 35 of the closure structure 8 includes thermally sensitive material such as wax, and as the wax expands in response to sensing temperatures at least above a threshold temperature, a second part 4 of the closure structure 8 which provides a piston 4, is moved in the axially extending chamber 32.

As with the previous embodiment described in relation to FIG. 1, the orifice 3A is closed by the piston 4 both if the pressure of the high pressure working fluid at the high pressure working fluid inlet 1, 2 falls below a threshold, and also in the event that the thermally sensitive material senses a temperature above a threshold temperature, or in response to a combination of reduced pressure in the axially extending chamber 32 and sufficiently high temperature being sensed. Again, as with the FIG. 1 embodiment, if desired the FIG. 2 embodiment may be provided as a two port apparatus, i.e. without the lower pressure system fluid inlet 26 depending on the requirements of the hydraulic system with which the apparatus is used.

Figure 3:
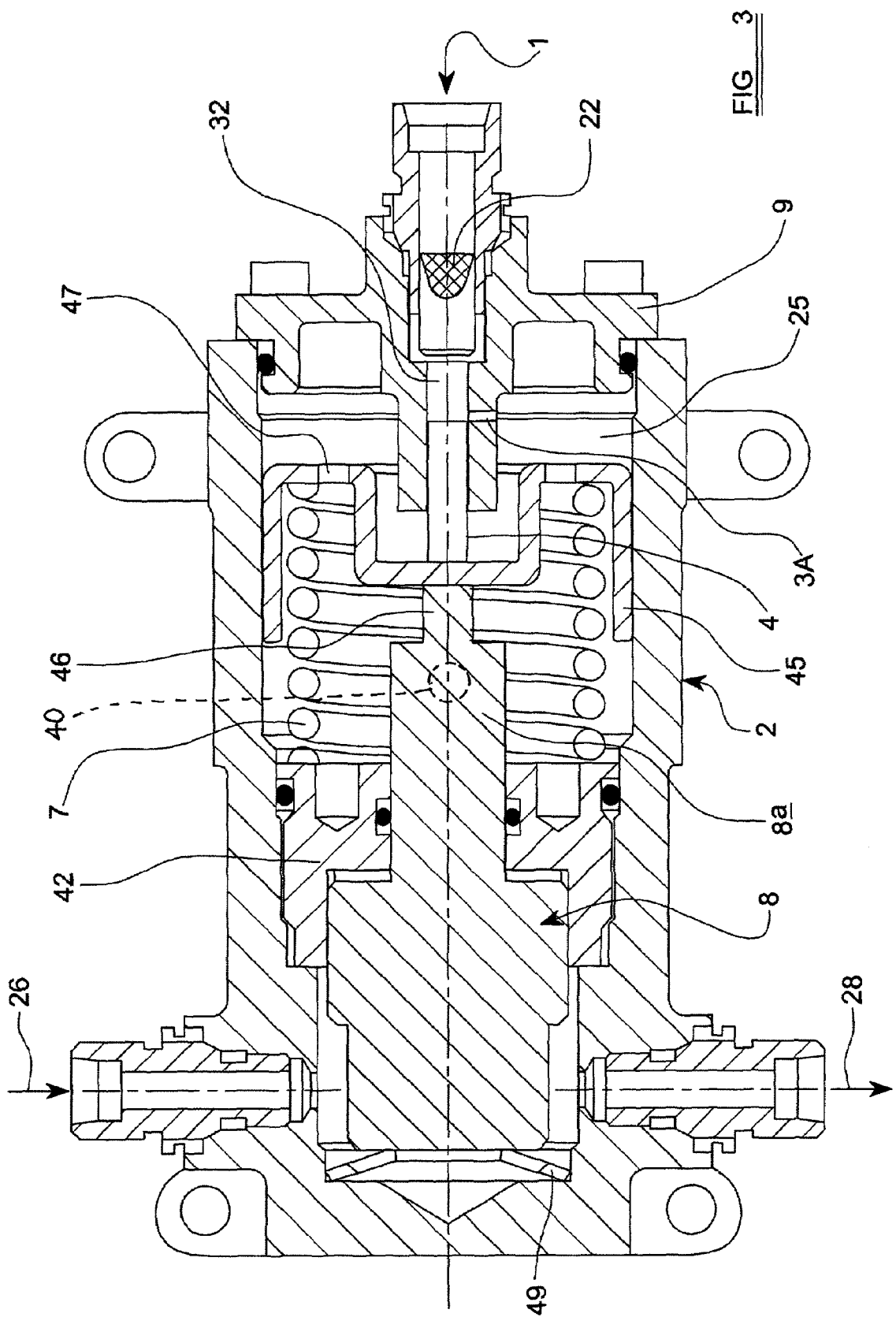
FIG. 3 is a fragmentary cross sectional view of a third embodiment of a hydraulic fluid heating apparatus.

FIG. 3 shows an embodiment similar to FIG. 1, but including an outlet port 40 for the working fluid, the position of which is shown in dotted lines only, which is separate from the outlet 28 for the system fluid. Working fluid which has passed through the combined orifice and restriction 3A passes into main chamber from where the outlet port 40 for the working fluid opens. The outlet port 40 opens transversely of the general flow direction of the system fluid from system fluid inlet 26 to system fluid outlet 28.

In this example, the resilient device (spring) 7 acts between a threaded retainer 42 which is screwed into and an integral part of the body 2, and a carrier 45 which carries a piston 4 which is operative in the axially extending chamber 32, the open and close the restrictor/orifice 3A. As well as the spring 7, a second closure structure part namely a piston 46 which is moveable as thermally sensitive material of the closure structure expands and contracts, acts on a carrier 45 of the closure structure 8, so that as with the previously described embodiments, the orifice 3A is closed both in response to a reduced working fluid pressure at the high pressure inlet 1, and in response to the thermally sensitive material sensing a temperature above a threshold temperature. In this example, the carrier 45 includes one or more openings 47 which permit working fluid which is passed through the orifice/restrictor 3A freely to flow in the main chamber 25 in which the carrier 45 is provided, and into contact with a portion 8a of a first part of the closure structure 8 which carries the thermally sensitive material, so that the thermally sensitive material is primarily responsive to the temperature of the working fluid within the body 2.

In this embodiment, the closure structure 8 bears on a disc spring 49 which resiliently resists movement of the closure structure 8 in response to the high pressure working fluid at the inlet 1.

In the example in FIG. 3, the inlet 1 for the high pressure working fluid, together with a strainer 22 and the axially extending passage 32 are all carried in a cap 9 which closes the main chamber 25 at a position opposite to the low pressure system fluid inlet and outlet ports 26, 28.

It will be appreciated that various modifications and changes may be made to the above described preferred embodiment of hydraulic heating apparatus without departing from the scope of the following claims.

The invention claimed is:

1. A hydraulic fluid heating apparatus including a body having an inlet for high pressure fluid, an outlet for heated fluid, a chamber within the body and a flow path for the high pressure fluid between the inlet and the chamber, a restriction in the flow path between the inlet and the chamber through which restriction the high pressure fluid is constrained to pass whereby the apparatus becomes heated, and an orifice through which the working fluid flowing from the inlet to the chamber must pass, a linearly acting closure structure, the closure structure being urged by a resilient device to a position in which the closure structure closes the orifice when the pressure of the high pressure fluid is below a threshold pressure, and wherein the closure structure includes a thermally sensitive material which expands in response to increasing temperature to cause the closure structure to close the orifice in response to the thermally sensitive material sensing a temperature above a threshold temperature, and wherein the high pressure fluid is a working fluid, and the body includes an inlet for lower pressure system fluid, the working fluid, after passing through the restriction, combining with the system fluid, and the working fluid and system fluid flowing to a common outlet from the body.

2. An apparatus according to claim 1 wherein the orifice is closed by the closure structure in response to a decrease in the pressure of the high pressure working fluid at the high pressure inlet below the threshold pressure, and/or in response to sensing a temperature above the threshold pressure.

3. An apparatus according to claim 1 wherein the high pressure fluid which was delivered to the high pressure fluid inlet and has flowed through the restriction is heated and passes to the outlet.

4. An apparatus according to claim 1 wherein the working fluid, in flowing from the high pressure inlet to its outlet, flows past a portion of the closure structure where the thermally sensitive material is provided so that the thermally sensitive material is primarily subjected to the temperature of the working fluid.

5. An apparatus according to claim 1 wherein the restriction through which the high pressure working fluid is constrained to flow to the chamber and the orifice are one in the same.

6. An apparatus according to claim 5 wherein the high pressure fluid inlet is provided at one end of a body of the apparatus, and the inflowing high pressure fluid flows into an axially extending chamber which has in a wall thereof the orifice which presents restriction to fluid flow to effect heating.

7. An apparatus according to claim 1 wherein the function of heating the apparatus by constraining the high pressure working fluid to pass through the restriction is separated from the orifice which controls working fluid flow.

8. An apparatus according to claim 1 wherein the closure structure includes a piston which moves in a chamber of a body of the apparatus in response to the thermally sensitive material expanding or contracting and in response to the differential forces exerted by the high pressure working fluid and the resilient device.

9. An apparatus according to claim 1 wherein the closure structure includes a first part on which the resilient device bears, and a second part which is moveable relative to the first part as the thermally sensitive material expands and contracts to close and open the orifice.

10. An apparatus according to claim 9 wherein the second part includes a piston which is moveable to close the orifice or the second part acts to move the first part on which the resilient device bears in response to temperature changes, the first part carrying a piston which is moveable to open and close the orifice.

11. An apparatus according to claim 1 wherein the high pressure working fluid inlet is provided at one end of the body of the apparatus, and inflowing high pressure working fluid flows into an axially extending chamber which has in a wall thereof the orifice, and the closure structure includes a first part on which the resilient device bears and which includes the thermally sensitive material and a second part which provides a piston which is operable to close the orifice, the orifice providing a flow path for working fluid to a restriction between the first closure structure part and a wall of the body of the apparatus, and the body providing a chamber into which the flowing working and system fluid passes and from which a common outlet opens.

12. An apparatus according to claim 1 wherein the high pressure fluid is a working fluid, and the body includes an inlet and an outlet for lower pressure system fluid, the working fluid, after passing through the restriction, combining with the system fluid, and the working fluid and system fluid flowing to a common outlet from the body, wherein there is an outlet for heated system fluid which is separate to an outlet for the working fluid, and wherein the lower pressure system fluid inlet, opens into a chamber through which the closure structure extends.

13. An apparatus according to claim 1 wherein the resilient device is a spring which acts between the closure structure and one of the body of the apparatus and a cap which engages with the body.

14. A hydraulic fluid heating apparatus including a body having an inlet for high pressure fluid, an outlet for heated fluid, a chamber within the body and a flow path for the high pressure fluid between the inlet and the chamber, a restriction in the flow path between the inlet and the chamber through which restriction the high pressure fluid is constrained to pass whereby the apparatus becomes heated, and an orifice through which the working fluid flowing from the inlet to the chamber must pass, a linearly acting closure structure, the closure structure being urged by a resilient device to a position in which the closure structure closes the orifice when the pressure of the high pressure fluid is below a threshold pressure, and wherein the closure structure includes a thermally sensitive material which expands in response to increasing temperature to cause the closure structure to close the orifice in response to the thermally sensitive material sensing a temperature above a threshold temperature, and wherein the high pressure fluid is a working fluid, and the body includes an inlet and an outlet for lower pressure system fluid and an outlet for heated system fluid which is separate to an outlet for the working fluid.

15. An apparatus according to claim 14 wherein the orifice is closed by the closure structure in response to a decrease in the pressure of the high pressure working fluid at the high pressure inlet below the threshold pressure, and/or in response to sensing a temperature above the threshold pressure.

16. A hydraulic system including a hydraulic heating apparatus which includes a body having an inlet for high pressure fluid, and an outlet for heated fluid, a chamber within the body and a flow path for the high pressure fluid between the inlet and the chamber, a restriction in the flow path between the inlet and the chamber through which restriction the high pressure fluid is constrained to pass, whereby the apparatus becomes heated, and wherein there is an orifice through which the working fluid flowing from the inlet to the chamber must pass, a linearly acting closure structure, the closure structure being urged by a resilient device to a position in which the closure structure closes the orifice when the pressure of the high pressure fluid is below a threshold pressure, and the closure structure including a thermally sensitive material, the material expanding in response to increasing temperature, to cause the closure structure to close the orifice in response to the thermally sensitive material sensing a temperature above a threshold temperature, and wherein the high pressure fluid is a working fluid, and the body includes an inlet for lower pressure system fluid, the working fluid, after passing through the restriction, combining with the system fluid, and the working fluid and system fluid flowing to a common outlet from the body.

17. A system according to claim 16 wherein the hydraulic heating apparatus is provided to heat fluid in a line for returning hydraulic fluid which has been used to power the operation of an upstream hydraulically powered device.

18. A system according to claim 17 wherein the upstream hydraulically powered device is an actuator for moving an aerofoil surface in an aircraft.

19. A hydraulic system including a hydraulic heating apparatus which includes a body having an inlet for high pressure fluid, and an outlet for heated fluid, a chamber within the body and a flow path for the high pressure fluid between the inlet and the chamber, a restriction in the flow path between the inlet and the chamber through which restriction the high pressure fluid is constrained to pass, whereby the apparatus becomes heated, and wherein there is an orifice through which the working fluid flowing from the inlet to the chamber must pass, a linearly acting closure structure, the closure structure being urged by a resilient device to a position in which the closure structure closes the orifice when the pressure of the high pressure fluid is below a threshold pressure, and the closure structure including a thermally sensitive material, the material expanding in response to increasing temperature, to cause the closure structure to close the orifice in response to the thermally sensitive material sensing a temperature above a threshold temperature, and wherein the high pressure fluid is a working fluid, and the body includes an inlet and an outlet for lower pressure system fluid and an outlet for heated system fluid which is separate to an outlet for the working fluid.

20. A system according to claim 19 wherein the hydraulic heating apparatus is provided to heat fluid in a line for returning hydraulic fluid which has been used to power the operation of an upstream hydraulically powered device.

* * * * *